US 12,045,781 B2

(12) United States Patent
Berry

(10) Patent No.: US 12,045,781 B2
(45) Date of Patent: *Jul. 23, 2024

(54) MANAGING CHANGED VERSIONS OF DATA OF A LISTING ASSOCIATED WITH AN ENTITY

(71) Applicant: Yext, Inc., New York, NY (US)

(72) Inventor: Benjamin Berry, New York, NY (US)

(73) Assignee: Yext, Inc., New York, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/943,693

(22) Filed: Jul. 30, 2020

(65) Prior Publication Data

US 2020/0402010 A1    Dec. 24, 2020

Related U.S. Application Data

(63) Continuation of application No. 15/596,530, filed on May 16, 2017, now Pat. No. 10,769,595.

(60) Provisional application No. 62/432,990, filed on Dec. 12, 2016.

(51) Int. Cl.
| | |
|---|---|
| *G06F 16/00* | (2019.01) |
| *G06F 16/23* | (2019.01) |
| *G06F 16/958* | (2019.01) |
| *G06Q 10/109* | (2023.01) |
| *G06Q 30/018* | (2023.01) |

(52) U.S. Cl.
CPC ....... *G06Q 10/109* (2013.01); *G06F 16/2365* (2019.01); *G06F 16/958* (2019.01); *G06Q 30/018* (2013.01)

(58) Field of Classification Search
CPC .......................... G06F 16/958; G06F 16/2365
See application file for complete search history.

(56) References Cited

U.S. PATENT DOCUMENTS

| | | | |
|---|---|---|---|
| 8,364,647 B1 | 1/2013 | Eastlund et al. | |
| 8,452,748 B1 | 5/2013 | Pugh | |
| 9,471,585 B1 | 10/2016 | Theimer | |
| 11,394,678 B2 * | 7/2022 | Rivelli | H04L 51/10 |
| 2007/0260628 A1 | 11/2007 | Fuchs et al. | |
| 2009/0077182 A1 | 3/2009 | Banjara et al. | |
| 2009/0112654 A1 * | 4/2009 | Neale | G06Q 10/06395 |
| | | | 705/7.41 |

(Continued)

OTHER PUBLICATIONS

Öksüz, Ayten, et al. "Designing Trust in Websites—An Evaluation of Leading Infrastructure as a Service Providers' websites." (2014).*

(Continued)

*Primary Examiner* — Nan Hutton
(74) *Attorney, Agent, or Firm* — Jeffri A. Kaminski; Venable LLP

(57) ABSTRACT

A changed version of first data of a listing associated with an entity provided via a webpage generated by a provider system is identified. The provider system is caused to revert to the first data of the listing associated with the entity. A first communication is transmitted to a client device associated with the entity, wherein the communication identifies the changed version of the first data. In response to receiving an indication from the client device of an acceptance of the changed version of the first data, the changed version of the first data is applied to the provider system.

20 Claims, 7 Drawing Sheets

(56) References Cited

U.S. PATENT DOCUMENTS

| | | | | |
|---|---|---|---|---|
| 2009/0216867 A1* | 8/2009 | Pusateri | ................ | H04L 41/085 |
| | | | | 709/222 |
| 2011/0047246 A1 | 2/2011 | Frissora et al. | | |
| 2016/0171557 A1* | 6/2016 | Fanous | ................ | G06F 16/951 |
| | | | | 705/14.66 |
| 2018/0082054 A1 | 3/2018 | Khwaja et al. | | |

OTHER PUBLICATIONS

Burgess, Stephen. "The use of third party website providers by Australian small businesses." International Journal for Digital Society 2.1 (2011): 328-336.*

* cited by examiner

400

430

450

Hello <FIRST NAME>,

<PUBLISHER> has suggested an update to the following locaiton:

<LOCATION NAME>
<ADDRESS>
<PHONE>

You can review the suggestion below and choose to accept or reject it

Content: Business Hours

| Suggested Edit | | Original Content | |
|---|---|---|---|
| Mon | 9:30 AM to 5:00 PM | Mon | 9:30 AM to 5:00 PM |
| Tue | 9:30 AM to 5:00 PM | Tue | 9:30 AM to 5:00 PM |
| Wed | 9:30 AM to 5:00 PM | Wed | 9:30 AM to 5:00 PM |
| Thu | 9:30 AM to 5:00 PM | Thu | 9:30 AM to 5:00 PM |
| Fri | 9:30 AM to 5:00 PM | Fri | 9:30 AM to 5:00 PM |
| Sat | Closed | Sat | Closed |
| Sun | Closed | Sun | Closed |

ACCEPT SUGGESTION

NO, Keep Original Content

If you have any questions, please contact support@yext.com

- Yext Client Support

MANAGING CHANGED VERSIONS OF DATA OF A LISTING ASSOCIATED WITH AN ENTITY

CROSS REFERENCE TO RELATED APPLICATIONS

This application is a continuation of U.S. patent application Ser. No. 15/596,530, filed May 16, 2017, which in turns claims the benefit of U.S. Provisional Application No. 62/432,990, filed Dec. 12, 2016. The entire disclosures of U.S. patent application Ser. No. 15/596,530 and U.S. Provisional Application No. 62/432,990 are hereby incorporated by reference herein.

TECHNICAL FIELD

The disclosure relates generally to online impression verification, and more particularly, to methods and systems for verifying publisher suggestions.

BACKGROUND

Various online services are available to locate and find listings about certain businesses and services. One of the challenges in providing business listings online is that a publisher must take care to ensure that the listings are presented with the correct information. Mistakes in the listing may range in severity, from being low in severity to being high in severity where the error in the business listing may be critical information for the business, such as a street address, phone number, hours of operations and or other types of critical information related to the business.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 4 illustrates an example of a communication interface for verifying publisher suggestions in accordance with implementations of the disclosure.

DETAILED DESCRIPTION

Figure 1:
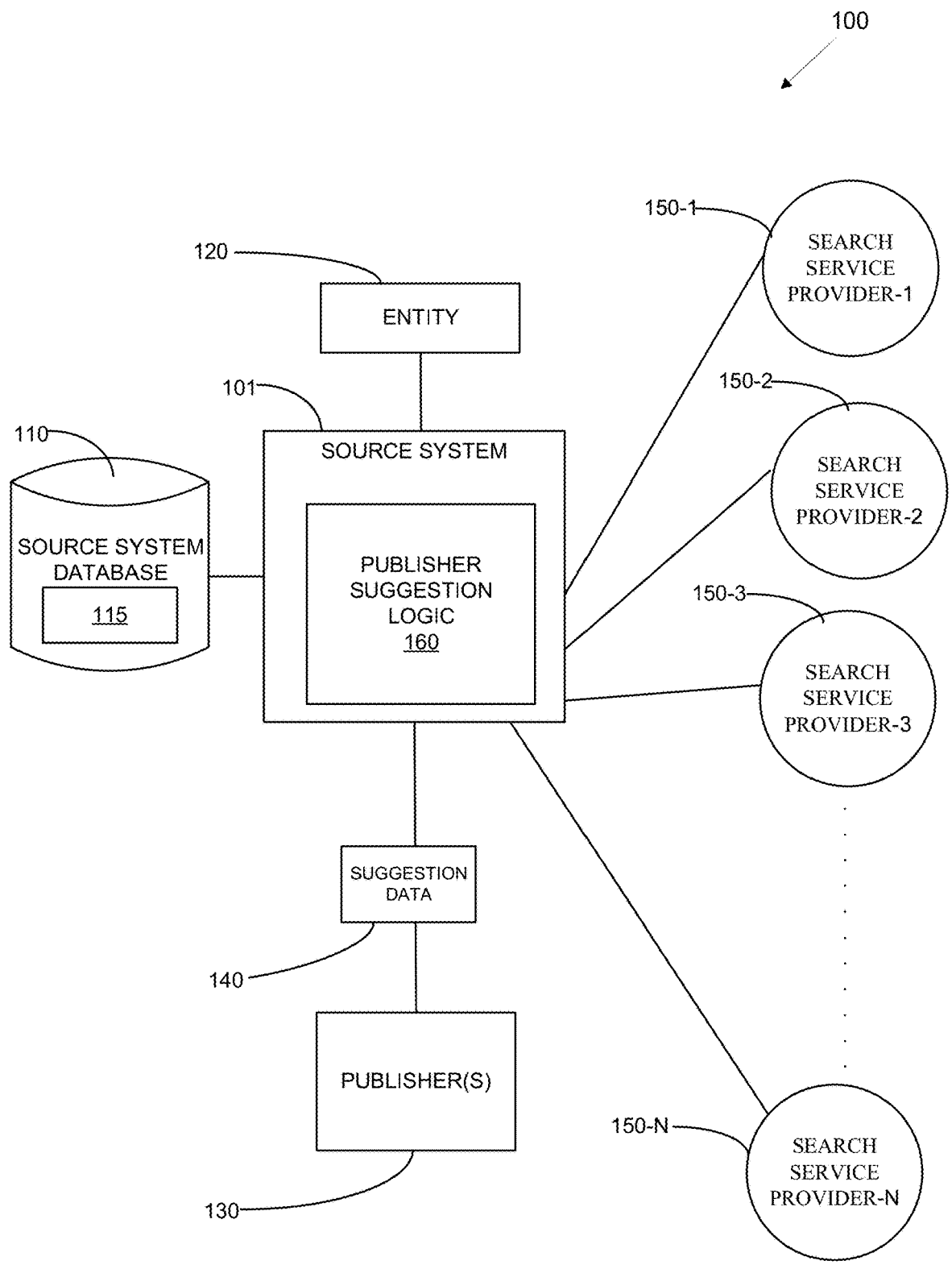
FIG. 1 illustrates an example of a conventional high-level architecture for verifying publisher suggestions in accordance with one or more aspects of the disclosure.

Taking care to correct incorrect information in a business listing is problematic because many publishers may not be aware of errors that are the result of sudden changes in the business information. For a publisher to determine whether the business information is incorrect can be a time consuming process because the business listings database can contain thousands of business listings. In this regard, reviewing each business listing would take an inordinate amount of time and the publisher still runs the risk of publishing a business listing containing incorrect information if the information changes again after the review process.

The present disclosure provides methods and systems for verifying publisher suggested changes to online business listings to ensure that online presence for an entity is always up to date. This is accomplished by prompting an entity about possible updates rather than waiting for them to alert a publisher. In some implementations, the methods and systems include a suggested change identifier to receive an indication of a suggested change to listing information associated with an entity. A data consistency analyzer determines whether the suggested change corresponds to previously stored information regarding the entity. Thereafter, a verification requestor initiates contact with a user device associated with the entity based on the suggested change. The user may then reject or confirm the suggested change via the communications module. Based on the user input, an updater module may apply the suggested changes to the online listing information associated with the entity, thereby updating the entity's presence online.

Implementations of the disclosure provide methods and systems for verifying publisher suggestions. In some situations, online publishers, such as Google™, occasionally receive submissions from users with suggested data and content updates regarding specific information (e.g., location information) associated with an entity. An entity may refer to a commercial entity, such as a business or a sole proprietorship, for which publishers may provide listing information in response to a user online search. Because the online data publishers may not be the source of the information contained in the received submissions, they cannot be sure that the information they provide is accurate.

To ensure the accuracy of the suggestions provided, the publishers need to verify this information. To this end, the techniques provided herein allow the entities, in some embodiments, to view those suggestions, and choose whether or not to incorporate them across their online presence. This allows an entity maximum control over the listing information and content that appears online about that entity by correcting inaccuracies that can confuse customers. These techniques also deliver real-time updates for enhanced content like photos and special offers provided by the entity and provide a way to optimize location data for the entity that is provided by the online publishers.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 illustrates an example of a conventional high-level architecture 100 for verifying publisher suggestions in accordance with one or more aspects of the disclosure. In some implementations, the conventional high-level architecture 100 includes a central computer (hereinafter "the source system 101") that may include a memory device (not shown) storing a plurality of software modules to implement publisher suggestion logic 160 for verifying publisher suggestions. The publisher suggestion logic 160 may be, for example, a hardware component, circuitry, dedicated logic, programmable logic, microcode, etc., that may be implemented in a processing device (not shown) of the source system 101.

The source system 101 may be communicatively connected to an entity 120 (e.g., a business), a plurality of search service providers 150-1 through N (which may be also be publishers 130), such as Google™, Facebook™, Yelp™, Citysearch™ Apple™, Bing™, and a system database 110. In one implementation, the conventional high-level architecture 100 may include software modules executed on one or more computer platforms of the source system 101 that are interconnected by one or more networks, which may include the Internet.

The term "computer" or "computer platform" of source system 101 is intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

In order to access the services of the source system 100 of FIG. 1, the entity 120 may register for an account with the source system 101. In some implementations, the entity 120 may access an API associated with the source system 101 to enter specific information 115 that may correspond to their business profiles on reviewing sites. This information 115 may be stored the source system database 110 and may include, for example, a business name, address, telephone number, a link to a website for the business, a pointer to a map of the location of the business, the business location on a map, a promotional message for the business, and a list of information regarding personal and product offerings of the business, which may include, but not limited to, menus, products services, upcoming and past events, etc. Each of the service provider 150-1-through N may host a computer platform that provides a plurality of modules (e.g., APIs) with which the source system 101 interacts for carrying out operations and providing result data between the source system 101 and the service provider computer platforms 150-1 through N.

In some implementations, the source system 101 can provide a listing regarding the entity 120 to all of the publishers/search service providers 150-1 through N to ensure that the entity's online presence is consistently known on the Internet. In this regard, the entity 120 needs only to access the single source system 101 for entering a common listing that is propagated from the single source system 101 in real or near-real time to the search service providers 150-1 through N. The single source system 101 may receive the listing information from the entity 120 for the purpose of creating a new listing or to modify an existing listing. Each entity listing may be indexed and stored by the source system 101 in the source system database 110 so that search service providers 150-1 through N and other users of the source system 101 may access the entries to obtain the listing information via, for example, the Internet.

In accordance with the publisher suggestion logic 160, the entity 120 may receive signals regarding suggestion data 140 for changes to the entity information. These suggestion data 140 signals may be received in several ways. In some implementations, the publisher 130 may update the data in its system regarding an entity 120. In this example, the source system 101 may recognize these changes to the data, and, subsequently, restores the data back to how it existed before the change. These publisher changes are then presented as one or more publisher suggestion data 140. Only if an end user accepts the suggestions will the suggested change be pushed to the publisher 130, and potentially automatically synced with the other publishers, such as the search service providers 150-1 through N.

In other implementations, the publisher 130 may obtain some signal regarding new information about the entity 120 from a different source other than the source system 101. For example, a visitor to a location associated with the entity 120 may notice that the hours of operations have changed for the entity 120 from what is posted online. In this example, the entity 120 may have changed its operating hours due to a holiday and forget to update this information with the source system 101. The visitor may post a message at the publisher's site or on other types of message boards indicating the change in the entity's hours of operation. The source system 101 may discover this suggested change of the entity's data at the publisher using, for example, via Web crawler tool to periodically check websites and social media sites for these changes. The Web crawler tool is a software application that browses the Internet in a methodical, automated manner to discovery web pages and information stored thereon. In some implementations, the source system 101 may directly receive the suggestion data 140 from a publisher 130. In turn, the source system 101 sends a signal to the entity 120 to determine if change of entity information in the suggestion data 140 is correct.

In some implementation, a location manager associated with the entity 120 may be provided with an interface for approving or rejecting the suggestion data changes. The location manager, in one implementation, is a user of the source system 101 with authority to manage the location data for the entity 120. For example, an entity 120 may assign a regional vice president who might have all the information for stores in a particular region, or, more specifically, to a specific store manager to handle suggestions that pertain to that manager's store. The location manager may receive a notification of pending suggestion data 140 changes from the source system 101, for example, on a dashboard of an interface. This dashboard may be periodically updated so that when the location manager logs in, they will be reminded of how many pending suggestions they have in queue to be reviewed.

After a review of the pending suggestion data 140, if the location manager associated with the entity 120 indicates that the suggestion data 140 is incorrect, the source system 101 continues to ensure that the entity's original data is maintained on the computer platform of the search service providers/publishers 150-1 through N. If the location manager indicates that the suggestion data 140 is correct, then the source system 101 may update this information on its internal system. This triggers a PowerListings™ update by the source system 101 to each publisher/search service provider 150-1 through N in the network for them to update their information related to the entity 120. The PowerListings™ ensures that the entity's listings on the search service providers/publishers 150-1 through N are present with the correct information. It automatically adds missing listings, and it updates critical fields like name, address, phone number, and other categories across the Internet.

In some implementations, the status of the pending suggestion data 140 may be in a data structure 115 in accordance with implementations of the disclosure. The data structure 115 may be stored in the source system database 110 and include, for example, a table, an array, tree, list or other types of data structures for storing relevant data for the publisher suggestions. The data structure 115 may be implemented using various different mechanisms. For example, hardware implementations, programmable logic arrays (PLAs), microcode read only memories (ROMs), etc. Below is one example of data structure 115.

| Field | Type | Notes |
| --- | --- | --- |
| Status | Enum | The status of the publisher suggestion. (Pending Action | Accepted | Rejected | Expired | Ignored) |
| Date Created | DateTime | The date and time the Source System Platform became aware of the suggestion. |
| Date Resolved | DateTime | The date and time the edit was transitioned to an end state, accepted, rejected, or expired. |
| Location | ID | The location the publisher suggestion is for. |
| Publisher | ID | The publisher that made the suggestion. |
| Resolver | ID | The user that resolved the suggestion. It should be clear if an employee did it on behalf of a user. |

As shown, the data structure 115 may include a plurality of fields that includes, but not limited to, a status field to indicate a current status of the suggestion (e.g., Pending Action, Accepted, Rejected, Expired or Ignored), a date created field indicating a date/time that the source system platform became aware of the suggestions, a date resolved field indicating a date/time the suggestion was resolved by a location manager, a location identifier field indicating a location for which the suggestion is directed, a publisher identifier indicating in publisher that transmitted the suggestion, and resolver identifier indicating the user that resolved the suggestion.

In some implementations, publisher suggestion logic 160 may implemented certain rules for manipulating the status field of the data structure 115. For example, the status field of the data structure 115 may have an initial "PENDING ACTION" indicator that changes once the suggestion is acted upon by a location manager. If the status field of suggestion is "ACCEPTED," this indicates the suggestion was accepted by a user. As a result, data associated with the suggestion is updated in the source system database 110 and this update is then delivered to all of the publishers/search service providers 150-1 through N. If the status field of suggestion is "REJECTED," this indicates that the suggestion was rejected by the user. In this regard, data for the entity 120 is not updated in the source system 101 and no publishers are updated. If the status field of suggestion is "CANCELED," this may indicate that another suggestion is received that may override the first suggestion. For example, a first suggestion may be received that the entity's name should be changed from "china gourmet" to "deluxe china gourmet." While that change is pending with the location manager, a second suggestion may be received that the entity's name should be "super china gourmet." In this example, the status for the first suggestion is set to CANCELED and a new pending suggestion for the entity is added for the "super china gourmet" name change. If the status field of suggestion is "INVALID," this indicates the received a suggestion may be for a field this not updatable on the publisher 130. If the status field of suggestion is "IGNORED," this indicates the source system 101 determined that the suggestion should not be considered, for example, the difference between original data and the change is very minor or insignificant. If the status field of suggestion is "REPEATED," this indicates a suggestion was received from a publisher 130, and the source system 101 already has the exact same suggestion in the NEW status from that publisher 130. In this case the new suggestion is recorded with the status REPEATED.

Repeated Suggestions

In some implementations, a repeated suggestion may indicate that a publisher 130 is repeatedly resetting the listing data in spite of the changes the source system 101 is making. If the publisher 130 submits actual suggestions rather than the source system 101 detecting them, this would not be the case. In that case, ignoring the repeated suggestions would be acceptable rather than repeatedly listings the suggestions that are continually being reset. In this regard, after an entity 120 has rejected a specific suggestion from a publisher 130 one time, the source system 101 does not notify them about that suggestion for a determined time period (e.g., one month). After two rejections, the determined time period may be increased ((e.g., two months) Then, after three rejections, the determined time period may further extended, such as for 12 months. ((e.g., two months).

In some implementations, whenever the source system 101 receives a suggestion from a publisher 130, the system checks if an entity 120 has actively dismissed that suggestion recently. If the entity has dismissed it recently, then, the system automatically dismisses the suggestion with the publisher 130 without consulting the entity 120. In this regard, the determined time period mentioned above gets longer the more times a particular suggestion has been actively rejected in a row. The purpose of this process is to avoid spamming the entity 120 if the publisher 130 is repeatedly making the same suggestion for some reason.

In one implementation, the source system 101 may receive suggestion data 140 from a publisher 130 on a significant portion of the entity's locations very frequently (e.g., every day). Because of this, a tremendous amount of API bandwidth can be consumed by certain publishers 130. Due to the fact that overall API bandwidth with each publisher 130 may be limited, the source system 101 may make the updates less frequently if the publisher 130 is constantly switching the data back. In some implementations, the source system 101 may coordinate with the client and/or publisher at some point to determine the cause of the constant data mix-up and resolve it outside the course of the automated system. In this case, the source system 101 may back off or ignore a repeat suggestion to preserve the overall integrity of the system. Although in some cases, this may not be the most prudent action to take in each individual case.

When deciding whether to ignore a repeat suggestion, the source system 101 as directed by the publisher suggestion logic 160 may consider the difference in time between when the NEW suggestion was received and the current date. For example, if the difference between the time of the NEW suggestion and the current date=0 or 1 days, the update is performed, if the difference is between 2-6 days, the update is performed every 2 days when the delta >%2, if the difference is between 7-13 days, the update is performed every 3 days when the delta >%3, if the difference is between 14-27 days, the update is performed every 4 days when the delta >%4, and if the difference is between 28+ days, the update is performed every 7 days when the delta >%7.

Ignoring Slight Differences

In some implementations, errors in the address of an entity 120 may account for many of the publisher suggestions. Many suggestions, however, are trivial to businesses and consumers. For example, the suggestion data 140 may indicate that an entity's address should be listed as "1 USA Drive" when it is original listed as "1 USA Dr." In such cases, the source system 101 may analyze the differences to determine whether to ignore certain know symbols (e.g., Dr. for Drive), and other types of differences that are below a percentage difference threshold. Whenever only slight differences are discovered, the status of the recorded suggestion is set to IGNORED.

Figure 2:
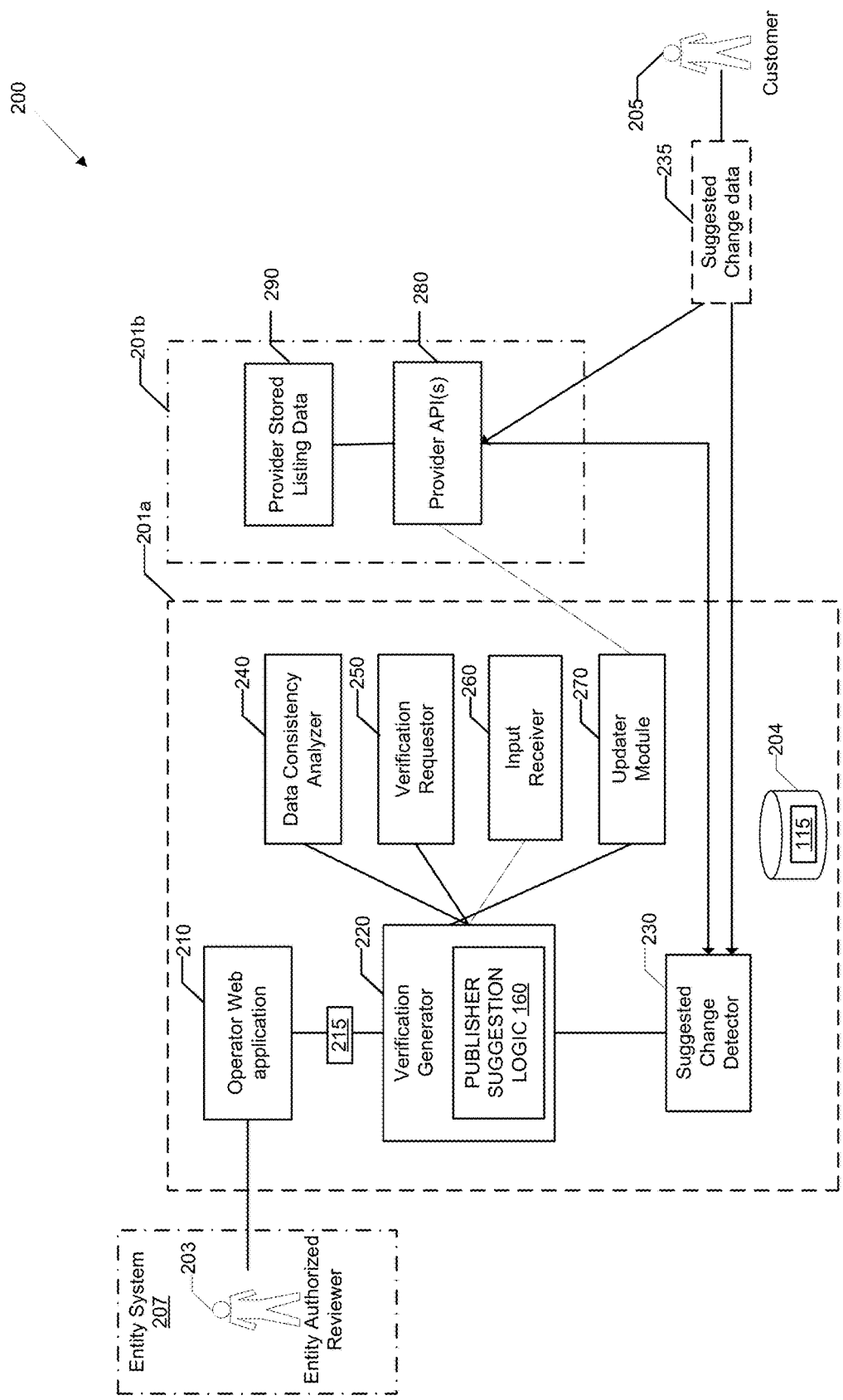
FIG. 2 illustrates an example of a system including memory for verifying publisher suggestions in accordance with one or more aspects of the disclosure.

FIG. 2 illustrates an example a system 200 including memory 204 for verifying publisher suggestions in accordance with one or more aspects of the disclosure. The system 200 may be executed on one or more computer platforms interconnected by one or more networks, which may include the Internet. In some embodiments, memory 204 may a system database (such as database 110), or a storage system comprising the system database. A central computer platform (hereinafter "the source system 201*a*") includes a system database 204 and a plurality of software modules 210, 220, 230, 240, 250, 260 and 270 that are communicatively connected with one or more entity systems 207, and a plurality of service provider computer platforms (hereinafter "the service provider system(s) 201*b*").

Each of the service provider computer platforms 201*b* provides a plurality of APIs 280 with which the source system 201*a* interacts for carrying out operations and providing and retrieving provider stored listing data 280 between the source system 201*a* and the service provider computer platforms 201*b* regarding listing information 115, for example, from an entity system 207. In that regard, the source system 201*a* can provide a listing regarding an entity associated with the entity system 207 to all of the service provider computer platforms 201*b* to ensure that the entity's online presence is consistently known on the Internet. The source system 201*a* may receive the listing information 115 from the entity system 207 for the purpose of creating a new listing or to modify an existing listing. Each entity listing 115 may be indexed and stored by the source system 201*a* in the source system database 204 so that the service provider computer platforms 201*b* and other users of the source system 201*a* may access the entries to obtain the listing information via, for example, the Internet.

To access the services of the source system 201*a*, an entity authorized reviewer 203 (such as a location manager) associated with the entity system 207 may be provided with an operator web application 210. The operator web application 210 allows the reviewer 203 to monitor and interact with publisher suggestions that are in queue to be authorized by the manager. The reviewer 203, in one implementation, is an authorized user of the source system 201*a* with authority to manage the location data for the entity system 207. For example, an entity may assign a regional vice president who might have all the information for stores in a particular region, or, more specifically, to a specific store manager to handle suggestions that pertain to that manager's store. The location manager may receive a notification of pending suggestion data via the operator web application 210. This operator web application 210 may be periodically updated so that when the reviewer 203 logs in, they will be reminded of how many pending suggestions they have in queue to be reviewed. Further aspects of the operator web application 210 as discussed with respect to FIG. 3.

With respect to FIG. 2, the source system 201*a* includes a verification generator 220. The verification generator 220 may implement the publisher suggestion logic 160 of FIG. 1. The verification generator 220 may interact with several modules of the source system 201*a* to facilitate operations to support publisher suggestion verification. For example, the source system 201*a* may include a suggested change detector 230 to detect the suggestion data 235 associated with the entity, a data consistency analyzer 240 to compare the suggestion data 235 with stored information 115 regarding the entity, a verification requestor 250 to provide an interface for initiating contact with the entities regarding the publisher suggestions, an input receiver 260 to receiver input indicating whether to accept or reject the suggested change, and a updater module 270 to provide updates to the search service provider computer platforms 201*b* regarding any verified changes to the online information regarding the entities. The functionally of the modules can exist in a fewer or greater number of components than what is shown, with such components residing at one or more processing devices of the source system, which may be geographically dispersed. The modules 230-270 may be operable in conjunction with the service provider computer platforms 201*b* from which they may receive and determine relevant information regarding the entities as discussed in more detail below.

The suggested change detector 230 identifies an indication from a source of a suggested change data 235 to an online listing data associated with an entity. For example, the suggested change detector 230 may become aware of the suggestion change data 140 via an API 280 associated with the service provider computer platforms 201*b*. In service provider computer platforms 201*b*, it may store original business data associated with the entity system 207 that is received from the source system 201*a*. In some situations, the service provider computer platforms 201*b* may receive an indication that this provider stored listing data 290 may be incorrect based on a signal from a customer 205. For example, the customer 205 may post a message at the service provider computer platforms 201*b* or on other types of message boards indicating a change in the entity's hours of operation from what is posted by the service provider. The suggested change detector 230 using the provider API 280 may periodically check for these changes or other types of changes by the publisher to the entity's data.

The data consistency analyzer 240 determines whether the suggested change data 235 matches previously stored information 115 regarding the entity. For example, the data consistency analyzer 240 may determine the percentage difference between the suggested change data 235 and the previously stored information 115. If this percentage difference is below a certain percentage difference threshold the data consistency analyzer 240 may reject the suggested change data 235. For example, many suggestions may be trivial to businesses and consumers. For instance, the suggested change data 235 may indicate that an entity's address should be listed as "1 USA Drive" when it is original listed as "1 USA Dr." In such cases, the data consistency analyzer 240 may analyze the differences to determine whether to ignore or otherwise reject certain know symbols (e.g., Dr. for Drive), and other types of differences that are below a percentage difference threshold.

In other implementations, data consistency analyzer 240 checks if an entity has actively dismissed that the suggested change data 235 recently. When deciding whether to reject a repeat suggestion, the data consistency analyzer 240 considers the difference in time between when the suggested change data 235 was received and the current date. For example, if the difference between the time of the suggested change data 235 and the current date=0 or 1 days, the update is performed, if the difference is between 2-6 days, the update is performed every 2 days when the delta>%2, if the difference is between 7-13 days, the update is performed every 3 days when the delta>%3, if the difference is between 14-27 days, the update is performed every 4 days when the delta>%4, and if the difference is between 28+ days, the update is performed every 7 days when the delta>%7.

The verification requestor 250 initiate a communication with the entity system 207 associated with the entity based on the suggested change data 235. For example, if the suggested change data 235 is not rejected, the reviewer 203 may receive an electronic communication containing a plurality of fields regarding the suggested change data 235 and controls that allows the manager to accept or reject the suggestion. Further aspects of the electronic communication are discussed with respect to FIG. 4.

Figure 3:
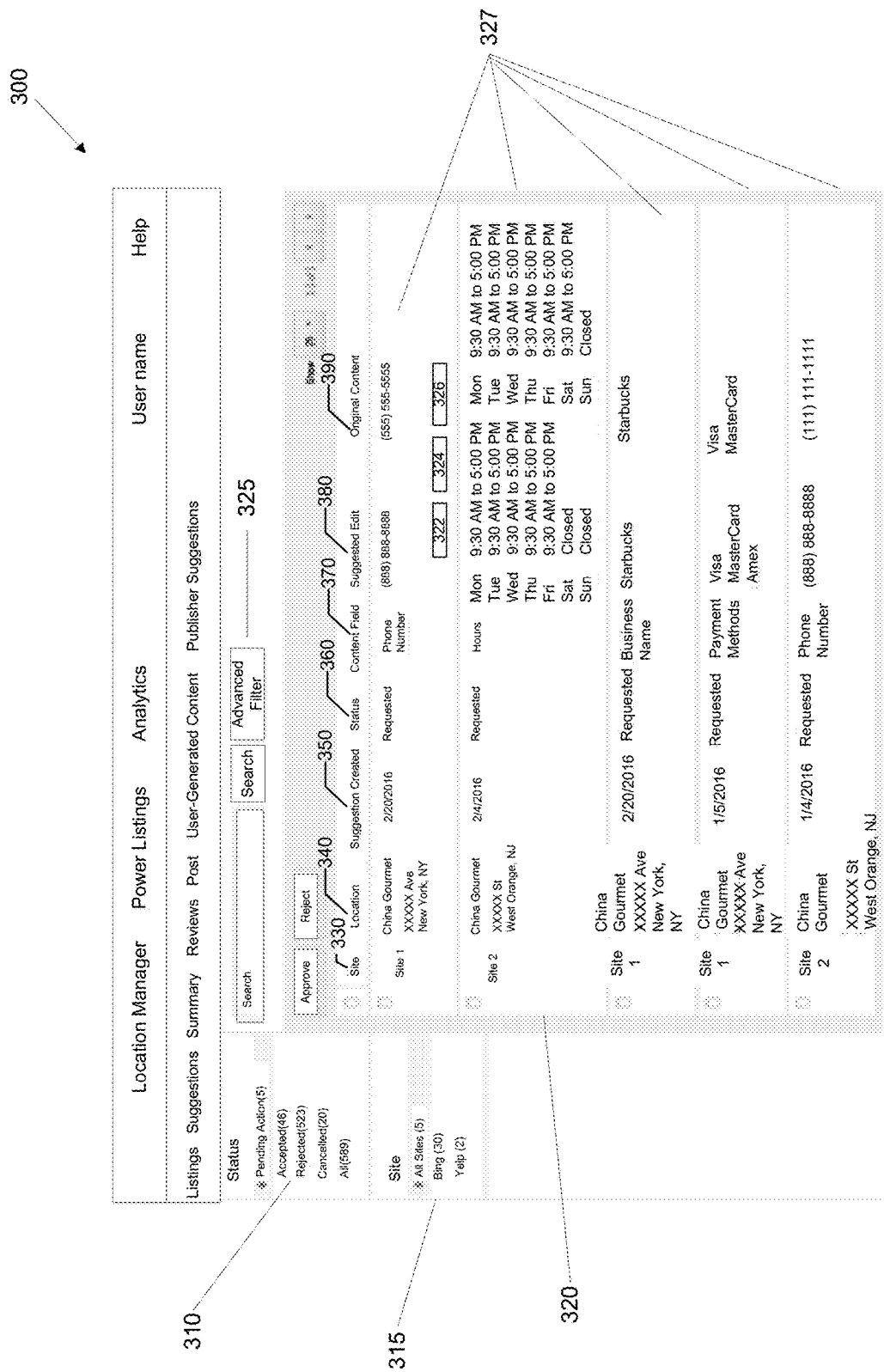
FIG. 3 illustrates an example of an interface dashboard for verifying publisher suggestions in accordance with implementations of the disclosure.

With regards to FIG. 3, the input receiver 260 receives input data 215 from the entity system 207 based on the initiated communication. For example, the input data 215 indicates whether to accept or reject the suggested change data 235. The input data 215 may also include edits to the suggested change data 235 as made by the reviewer 203 that received the initiated communication via the operator Web application 210. Further aspects of the operator Web application are discussed with respect to FIG. 3.

The updater module 270 applies the suggested change data 235 to the online listing data at the service provider computer platforms 201b in accordance with the input data 215. If, for example, the input data 215 indicates that reviewer 203 has rejected the data because it is incorrect, the source system 201a continues to ensure that the entity's original data is maintained on the service provider computer platforms 201b. If the input data 215 indicates that reviewer 203 has accepted the suggested change data 235, the updater module 270 updates its listing data for the entity in the database 204. This triggers a PowerListings™ update by the updater module 270 to each service provider computer platforms 201b via the provider APIs 280 for them to update their information related to the entity based on the suggested change data 235. The PowerListings™ ensures that the entity's listings on the search service provider computer platforms 201b are present with the correct information for the entity.

FIG. 3 illustrates an example an interface dashboard 300 for verifying publisher suggestions in accordance with implementations of the disclosure. In some implementations, the interface dashboard 300 may correspond to a portal of the operator Web application 210 of FIG. 2. The interface portal 300 provides an example interface in which the source system can alert and entity 120 or an entity authorized reviewer 203 for the entity 120 of publisher suggestions that are in queue to be authorized.

In some implementations, the interface dashboard 300 may include several panels that include a status panel 310 that displays the number of publisher suggestions in a particular grouping, such as accepted, rejected, canceled, etc., a sites panel 315 to display the number of publisher suggestions associated with a particular search service provider, and a publisher suggestion panel 320 to display a plurality of publisher suggestions 327 for the user to review. The publisher suggestion panel 320 also includes a number of display columns detailing information regarding each of the publisher suggestions 327, such as site information 330, location information 340, suggestion created date 350, status information 360, content field 370, suggested edit 380, and the original content 390. Each publisher suggestions 327 may also include controls, such as 322, 324 and 326, that allow the user to manipulate or otherwise interact with the suggestions. In other implementations, the controls, such as 322, 324 and 326 may be disposed in a drop-down menu activated by clicking a mouse over a particular suggestion.

Each of the publisher suggestions 327 may have an initial status indicator 360 on the interface dashboard 300 that changes once the suggestion is acted upon by a user. During the life cycle of the publisher suggestion, a source system (e.g., source system 101) may continuously update the status of a particular suggestion data (e.g., suggestion data 140) based on actions taken by an user, such as a location manager associated with an entity (e.g., entity 120) and/or publishers (e.g., publisher 130), in the system 101. The source system 101 may share data by allowing the user to transmit verification results regarding the suggestion data 140 from one publisher and communicate this information to other registered publishers to update their respective listings to correspond with the listings information stored at the source system 101.

If the user accepts the publisher suggestions on the dashboard 300, the user clicks an accept action control 322 on a single row of a suggestion on the dashboard 300 or invokes an accept bulk action after selecting at least one publisher suggestion in the "Pending Action" state. When the actor invokes the accept action control 322, the source system applies each publisher suggestion by updating a field associated with the entity with the suggested edit 380 new value. Then, the publisher suggestion status 360 is updated to accepted, a resolved time for the suggestion is set to current time, and a resolved by field is set to user that took the action. If the user attempts to apply more than one suggestion to the same content field 370, the source system 101 notifies the user that more than 2 suggestions to the same content field 370 cannot be applied at the same time. In this regard, no publisher suggestions are applied until the duplication is resolved by the user, such as rejecting one of the duplicate suggestions.

If the user rejects the publisher suggestion on the dashboard 300, the user clicks a reject action control 324 on a single row of a suggestion on the dashboard or invokes reject bulk action after selecting at least one publisher suggestion in the "Pending Action" state. When the actor invokes the reject action control 324, each publisher suggestion status 360 is updated to rejected, the resolved time is set to current time and resolved by field is set to user that took the action.

If the user wishes to reject & edit the publisher suggestion on the dashboard 300, the user clicks reject & edit action control 326 on a single row a suggestion on the dashboard 300. When the user invokes the reject & edit action control 326, the publisher suggestion status 360 is updated to rejected, the resolved time is set to current time and resolved by field is set to user that took the action. Then, the dashboard 300 provides a suggested edit field 380 opened for edit that allows the user to provide updated information for the suggestion.

If the user wishes filter publisher suggestions on the dashboard 300, the user clicks on a filter control 325 on the dashboard. Using the filter control 325, the user can trigger several actions, such as clicking on one of a plurality of quick filters, adding advanced filter criteria, updating an advanced filter criteria and removing an advanced filter criteria. When the user clicks on a filter control 325 (e.g., Accepted Suggestions), the source system 101 updates the dashboard 300 to only display suggestions that correspond to that filter. If one or more filters are chosen by the user, the dashboard 300 is updated to display suggestions that correspond to the one or more filters. If one of the filters is deleted, the dashboard 300 is updated to remove from display the suggestions that correspond to delete filter.

FIG. 4 illustrates an example of a communication interface 400 for verifying publisher suggestions in accordance with implementations of the disclosure. In this example, the reviewer 203 can review suggestions data in the interface 400 and choose whether to accept or reject it. In some implementations, a user can configure source system 101 to transmit the publisher suggestions via an electronic communication interface 400, such as an email or text message. The user can configure the source system 101 to send the communications at a certain frequency, such as on a particular day of the week (Tuesdays), or to multiple electronic contact addresses. When a new publisher suggestion is ingested by the source system 101, the user receives an electronic communication interface 400 containing a plurality of fields 410-430, for example, an info field 410 including the publisher that made a suggestion, the location associated with the suggestion, a suggested edits field 420 that indicates where the suggestion is directed to and an original content field 430 indicating the current content the suggestions are to be applied to. The electronic communication interface 400 also include and a controls 440-450 (e.g., activation buttons) to accept or reject the suggestion.

If the user invokes the reject action 450 from the electronic communication interface 400, the publisher suggestion at the source system 101 is updated to rejected, the resolved time is set to current time and resolved by field is set to actor who took the action. The user receives a confirmation communication that the suggested edit has been rejected and their original data is retained. If user invokes the accept action 440 from the electronic communication interface 400, publisher suggestion at the source system 101 is updated to accepted, the resolved time is set to current time, and resolved by field is set to user who took the action. The user receives a confirmation communication that that the suggestion has been accepted and shows their updated data which is then published out to the search service providers 150-1 through N.

Figure 5:
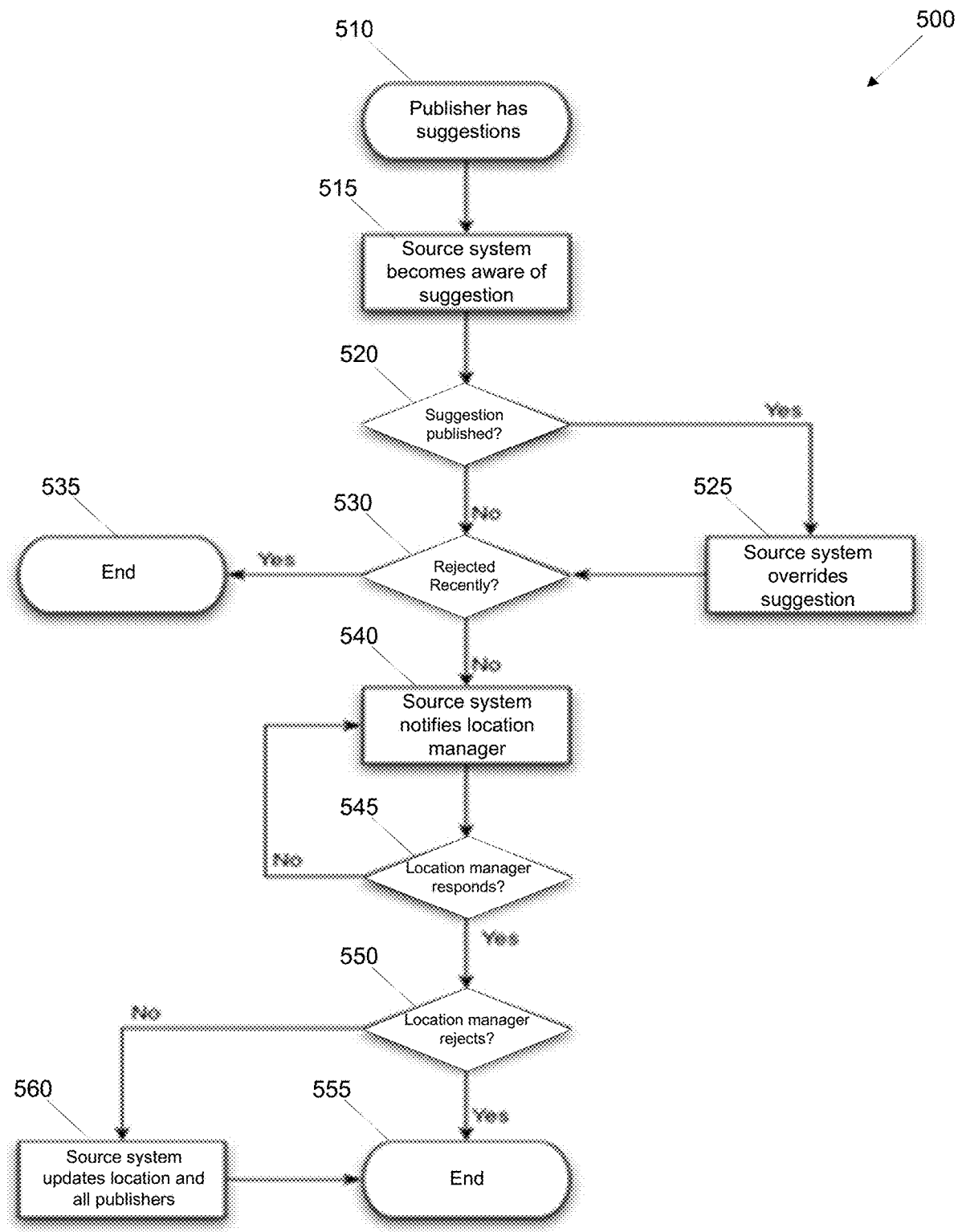
FIG. 5 illustrates a data flow diagram of a method for verifying publisher suggestions in accordance with implementations of the disclosure.

FIG. 5 illustrates a data flow diagram of a method 500 for verifying publisher suggestions in accordance with an implementation of the disclosure. In one implementation, a processing device of source system 101 as executed in accordance with the publisher suggestions logic 160 of FIG. 1 may perform method 500 to verify publisher suggestions. The method 500 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 500 and each of its individual functions. In certain implementations, a single processing thread may perform method 500. Alternatively, two or more processing threads with each thread executing one or more individual functions, routines, subroutines, or operations may perform method 500. It should be noted that blocks of method 500 depicted in FIG. 5 can be performed simultaneously or in a different order than that depicted.

The method 500 begins at block 510 where a publisher 130 has received a signal of a suggestion to change some listing information associated with an entity 120. In block 515, the source system 100 becomes aware of the suggestion data 140. For example, some publishers 130 maintain a management platform for businesses, which may be integrated into the source system 101 via an API. In that platform, the publisher 130 may store original business data associated with the entity 120 that they received from the source system 101. In some situations, the publisher 130 may overly this data when they receive an indication that the data may be incorrect based on a signal from another sources other than the source system 101. Here, the source system 101 using the API may periodically check for these overlays or other types of changes by the publisher to the entity's data. When the overlays are discovered by the source system 101, the system may determine whether these overlays are correct.

Method 500 branches at block 520 where it is determined whether the suggestion data 140 published. If a suggest change associated with the overlays is published, for example, by the publisher 130 meaning that they took this suggestion as fact in their process, method 500 may proceed to block 525, otherwise method 500 proceeds to block 530. At block 525, the source system 101 may override this suggestion data 140 until the overlays are verified. For example, the publisher's process of creating a suggestion may also publish that suggestion as fact before it can be verified. In this case, the source system 101 puts its stored entity data back into the publisher 130 because the source system 101 is considered the system of record for that entity's listings data. The source system 101 basically declares that the suggestion data 140 is untrue and resets the data to what the entity 120 originally had in the source system 101. The basic premise of the source system 101 is to provide entities control over their data, thus giving them the most control in this case.

At block 530, method 500 branches where it is determined whether the suggestion data 140 was rejected recently. For example, the source system 101 checks if the entity 120 has actively dismissed that suggestion data 140 within a determined time period. If the suggestion was recently rejected by the entity 120, method 500 proceeds to block 535 where the suggestion is rejected again and the method 500 ends. Otherwise, method 500 proceeds to block 540 where the source system 101 sends a notification to the location manager regarding the suggested edit to the entity's listing. If the location manager does not respond after a determined period of time, method 500 may proceed back to block 540 where the source system 101 may resend the notification or a reminder to the location manager that they have suggestions in queue pending action.

If the location manager rejects the suggestions, method 500 proceed to block 555 where the source system 101 updates the state of suggestion to rejected, the resolved time is set to current time and resolved by field is set to the location manager that took the action. In this regard, data for the entity 120 is not updated in the source system 101 and no publishers are updated. The method 500 then ends.

If the location manager accepts the suggestions, method 500 proceeds to block 560 where the source system 101 updates the state of suggestion to accepted, the resolved time is set to current time and resolved by field is set to the location manager that took the action. The source system 101 applies the publisher suggestion data 140 by updating a field in a database table associated with the entity with the suggested new value. This update is the delivered to all of the publishers/search service providers 150-1 through N to similarly update their respective platforms.

Figure 6:
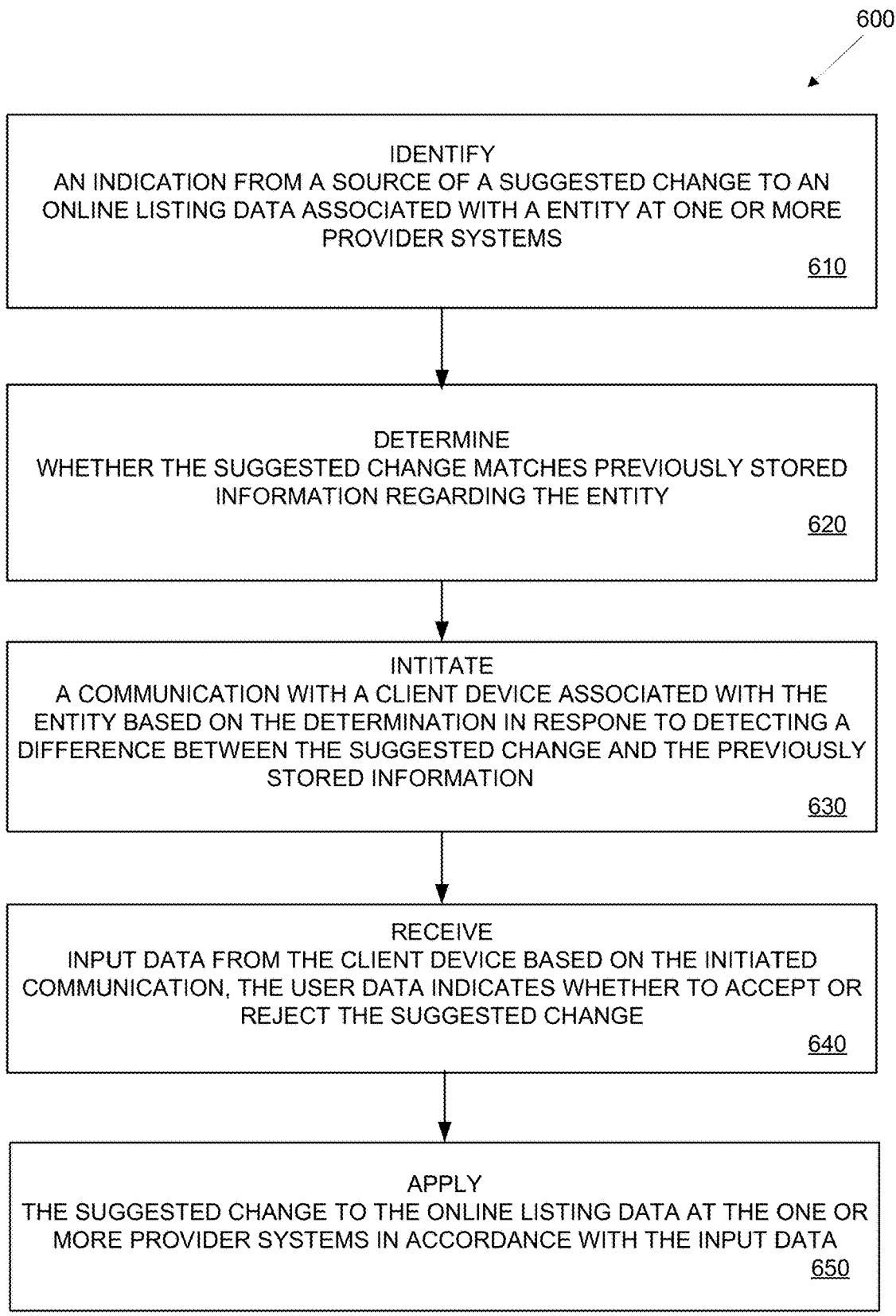
FIG. 6 illustrates a data flow diagram of another method for verifying publisher suggestions in accordance with implementations of the disclosure.

FIG. 6 illustrates a flow diagram of a method 600 in accordance with an implementation of the disclosure. In one implementation, a processing device of source system 101 as executed in accordance with the publisher suggestions logic 160 of FIG. 1 may perform method 600 to verify publisher suggestions. The method 600 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 600 and each of its individual functions. In certain implementations, a single processing thread may perform method 600. Alternatively, two or more processing threads with each thread executing one or more individual functions, routines, subroutines, or operations may perform method 600. It should be noted that blocks of method 600 depicted in FIG. 6 can be performed simultaneously or in a different order than that depicted.

Referring to FIG. 6, at block 610, method 600 identifies an indication from a source 207 of a suggested change data 235 to an online listing data 280 associated with an entity 120 at one or more provider systems 201b. It is determined in block 620 whether the suggested change 235 matches previously stored information 115 regarding the entity 120. Responsive to detecting a difference between the suggested change data 235 and the previously stored information 115, a communication with a client device 207 associated with the entity 120 is initiated in block 630 based on the suggested change data 235. In block 640, input data 215 is received from the client device 207 based on the initiated communication. The input data 215 indicates whether to accept or reject the suggested change data 235. In block 650, the suggested change data 235 is applied to the online listing data 280 at the one or more provider systems 201b in accordance with the input data 215.

Figure 7:
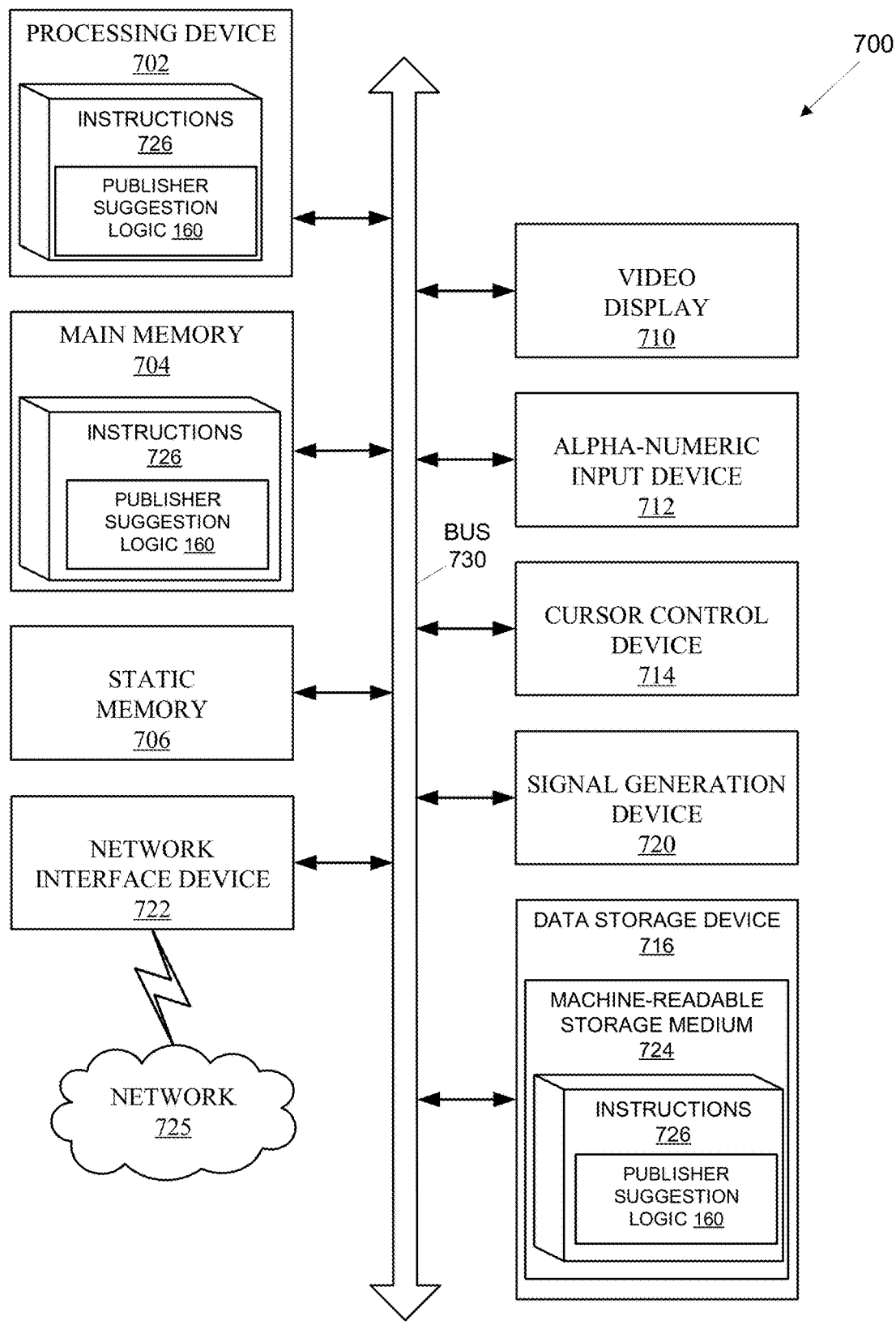
FIG. 7 illustrates an example computer system operating in accordance with some implementations.

FIG. 7 illustrates an example computer system 700 operating in accordance with some embodiments of the disclosure. In FIG. 7, a diagrammatic representation of a machine is shown in the exemplary form of the computer system 700 within which a set of instructions, for causing the machine to perform any one or more of the methodologies for verifying publisher suggestions as discussed herein, may be executed. In alternative embodiments, the machine 700 may be connected (e.g., networked) to other machines in a local area network (LAN), an intranet, an extranet, or the Internet. The machine 700 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 700. Further, while only a single machine is illustrated, the term "machine" shall also be taken to include any collection of machines that individually or jointly execute a set (or multiple sets) of instructions to perform any one or more of the methodologies discussed herein.

The Example computer system 700 may comprise a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 716), which may communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute dynamic review optimizer logic 160 for performing the operations and steps discussed herein. For example, the processing device 702 may be configured to execute instructions implementing method 500 and method 600, for optimizing dynamic review generation for redirecting request links, in accordance with one or more aspects of the disclosure.

Example computer system 700 may further comprise a network interface device 722 that may be communicatively coupled to a network 725. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 720 (e.g., a speaker).

Data storage device 716 may include a computer-readable storage medium (or more specifically a non-transitory computer-readable storage medium) 724 on which is stored one or more sets of executable instructions 726. In accordance with one or more aspects of the present disclosure, executable instructions 726 may comprise executable instructions encoding various functions of the publisher suggestion logic 160 in accordance with one or more aspects of the present disclosure.

Executable instructions 726 may also reside, completely or at least partially, within main memory 704 and/or within processing device 702 during execution thereof by example computer system 700, main memory 704 and processing device 702 also constituting computer-readable storage media. Executable instructions 726 may further be transmitted or received over a network via network interface device 722.

While computer-readable storage medium 724 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "initiating," "transmitting," "receiving," "producing," "updating," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    identifying at a source system a changed version of first data of a listing associated with an entity provided via a webpage generated by a provider system, wherein the changed version is caused by an end-user system of the provider system;
    determining at the source system a difference between the changed version of the first data and a stored version of the first data is greater than a threshold level;
    in response to the determining, causing, by a processing device, the provider system to revert to the stored version of the first data of the listing associated with the entity;
    transmitting a communication from the source system to a system associated with the entity, wherein the communication from the source system identifies the changed version of the first data;
    receiving at the source system an indication from the system associated with the entity of an acceptance of the changed version of the first data; and
    responsive to the indication, accessing each of a set of provider systems via a respective interface to update a respective stored version of the listing associated with the entity to the changed version of the first data.

2. The method of claim 1, wherein the provider system generates a search result comprising the changed version of the first data of the listing associated with the entity in response to a search request.

3. The method of claim 1, wherein causing the provider system to revert to the stored version of the first data comprises accessing the provider system via an interface and changing the changed version of the first data to the stored version of the first data of the listing in a data store of the provider system.

4. The method of claim 1, wherein the changed version of the first data is updated in the provider system via a first change to the stored version of the first data of the listing stored by the provider system to the changed version of the first data.

5. The method of claim 1, further comprising identifying the set of provider systems storing the listing associated with the entity.

6. The method of claim 1, wherein, following the accessing, a first stored version of the provider system matches a second stored version of a further provider system of the set of provider systems.

7. The method of claim 1, wherein the changed version is entered by the end-user system via a user interface of the provider system.

8. A system comprising:
    a memory to store instructions; and
    a processing device, operatively coupled to the memory, to execute the instructions to perform operations comprising:
    identifying a changed version of first data of a listing associated with an entity provided via a webpage generated by a provider system, wherein the changed version is caused by an end-user system of the provider system;
    determining with the processing device a difference between the changed version of the first data and a stored version of the first data is greater than a threshold level;

in response to the determining, causing, by the processing device, the provider system to revert to the stored version of the first data of the listing associated with the entity;

transmitting a communication from the processing device to a system associated with the entity, wherein the communication identifies the changed version of the first data;

receiving at the processing device an indication from the system associated with the entity of an acceptance of the changed version of the first data; and responsive to the indication, accessing each of a set of provider systems via a respective interface to update a respective stored version of the listing associated with the entity to the changed version of the first data.

9. The system of claim 8, wherein the provider system generates a search result comprising the changed version of the first data of the listing associated with the entity in response to a search request.

10. The system of claim 8, wherein causing the provider system to revert to the stored version of the first data comprises accessing the provider system via an interface and changing the changed version of the first data to the stored version of the first data of the listing in a data store of the provider system.

11. The system of claim 8, wherein the changed version of the first data is updated in the provider system via a first change to the stored version of the first data of the listing stored by the provider system to the changed version of the first data.

12. The system of claim 8, the operations further comprising identifying the set of provider systems storing the listing associated with the entity.

13. The system of claim 8, wherein, following the accessing, a first stored version of the provider system matches a second stored version of a further provider system of the set of provider systems.

14. The system of claim 8, wherein the changed version is entered by the end-user system via a user interface of the provider system.

15. A non-transitory computer readable storage medium comprising instructions that, when executed by a processing device of a source system, cause the processing device to perform operations comprising:

identifying at a source system a changed version of first data of a listing associated with an entity provided via a webpage generated by a provider system, wherein the changed version is entered by an end-user system via the provider system;

determining at the source system a difference between the changed version of the first data and a stored version of the first data is greater than a threshold level;

in response to the determining, causing the provider system to revert to the stored version of the first data of the listing associated with the entity;

causing the provider system to revert to the first data of the listing associated with the entity;

transmitting a communication from the source system to a system associated with the entity, wherein the communication from the source system identifies the changed version of the first data;

receiving from the source system an indication from the system associated with the entity of an acceptance of the changed version of the first data; and responsive to the indication, accessing each of a set of provider systems via a respective interface to update a respective stored version of the listing associated with the entity to the changed version of the first data.

16. The non-transitory computer readable storage medium of claim 15, wherein, following the accessing, a first stored version of the provider system matches a second stored version of a further provider system of the set of provider systems.

17. The non-transitory computer readable storage medium of claim 16, wherein the provider system generates a search result comprising the changed version of the first data of the listing associated with the entity in response to a search request.

18. The non-transitory computer readable storage medium of claim 16, wherein the changed version of the first data is updated in the provider system via a first change to the stored version of the first data of the listing stored by the provider system to the changed version of the first data.

19. The non-transitory computer readable storage medium of claim 15, wherein causing the provider system to revert to the stored version of the first data comprises accessing the provider system via an interface and changing the changed version of the first data to the stored version of the first data of the listing in a data store of the provider system.

20. The non-transitory computer readable storage medium of claim 15, the operations further comprising:

identifying a set of provider systems storing the listing associated with the entity; and responsive to the indication of the acceptance of the changed version, applying the changed version of the first data to the set of provider systems by accessing each of the set of provider systems via a respective interface and changing a respective stored version of the listing to the changed version of the first data.

\* \* \* \* \*